United States Patent

Maurer et al.

(10) Patent No.: US 9,568,052 B2
(45) Date of Patent: Feb. 14, 2017

(54) CLUTCH SPOOL VALVE ASSEMBLY

(71) Applicant: Eaton Corporation, Cleveland, OH (US)

(72) Inventors: Adam Maurer, Portage, MI (US); Jerry Brittan, Mattawan, MI (US); Robert Kanda, Lake Orion, MI (US)

(73) Assignee: Eaton Corporation, Cleveland, OH (US)

( * ) Notice: Subject to any disclaimer, the term of this patent is extended or adjusted under 35 U.S.C. 154(b) by 54 days.

(21) Appl. No.: 14/315,480

(22) Filed: Jun. 26, 2014

(65) Prior Publication Data

US 2015/0001024 A1 Jan. 1, 2015

Related U.S. Application Data

(60) Provisional application No. 61/839,502, filed on Jun. 26, 2013.

(51) Int. Cl.
*F16D 48/02* (2006.01)
*F16D 25/12* (2006.01)
*F16D 13/72* (2006.01)
*F16D 13/74* (2006.01)

(52) U.S. Cl.
CPC ............... *F16D 48/02* (2013.01); *F16D 13/72* (2013.01); *F16D 13/74* (2013.01); *F16D 25/123* (2013.01); *F16D 2048/029* (2013.01); *F16D 2048/0209* (2013.01); *F16D 2300/0214* (2013.01); *F16D 2300/06* (2013.01); *Y10T 137/86759* (2015.04); *Y10T 137/86767* (2015.04)

(58) Field of Classification Search
CPC ................... F16D 2048/029; Y10T 137/86767

USPC ....................................................... 137/625.34
See application file for complete search history.

(56) References Cited

U.S. PATENT DOCUMENTS

| | | | |
|---|---|---|---|
| 4,567,971 A * | 2/1986 | Hille | ............... F16D 25/14 192/109 F |
| 7,976,419 B2 | 7/2011 | Hartinger et al. | |
| 2006/0006043 A1* | 1/2006 | Koenig | ............... F16D 25/10 192/113.3 |
| 2013/0253785 A1 | 9/2013 | Murasawa et al. | |

FOREIGN PATENT DOCUMENTS

EP 1674765 A1 6/2006

* cited by examiner

*Primary Examiner* — Jacob S Scott
*Assistant Examiner* — Timothy M Hannon
(74) *Attorney, Agent, or Firm* — Remarck Law Group PLC (57) ABSTRACT

According to an embodiment, a valve assembly is provided for use with a fluid system for controlling flow rate to a fluid circuit for cooling and/or lubricating a clutch assembly in a transmission. The spool valve has a first outlet and a second outlet in fluid communication with the fluid circuit. The spool valve has a first configuration with zero flow to the fluid circuit, a second configuration providing a first flow to the fluid circuit through the first outlet, and a third configuration providing a second flow to the fluid circuit through the first and second outlets. The first outlet has a metering orifice. The flow across the valve is a function of the stroke distance of the spool.

20 Claims, 6 Drawing Sheets

CLUTCH SPOOL VALVE ASSEMBLY

CROSS-REFERENCE TO RELATED APPLICATIONS

This application claims the benefit of U.S. provisional Application No. 61/839,502 filed Jun. 26, 2013, the disclosure of which is incorporated in its entirety by reference herein.

TECHNICAL FIELD

Various embodiments relate to a valve assembly for controlling fluid flow to a clutch assembly such as a dual clutch assembly in a transmission for cooling and/or lubrication of the clutch assembly.

BACKGROUND

A clutch assembly, such as a dual clutch assembly in a dual clutch transmission may be a wet clutch. The clutch assembly may be controlled using an actuator, including a mechanical or electromechanical actuator or a fluid flow for actuating the clutch assembly. The clutch assembly may require cooling and/or lubrication during operation, and this may be provided using a cooling and/or lubricating fluid, separate from the actuating fluid.

SUMMARY

According to an embodiment, a fluid system for controlling flow rate to a clutch assembly in a transmission is provided with a fluid source, and a fluid circuit for a clutch assembly in the transmission. The fluid circuit is adapted for at least one of cooling and lubricating the clutch assembly. A spool valve is also provided for regulating a rate of fluid flow from the fluid source to the fluid circuit of the clutch assembly. The spool valve has a first outlet and a second outlet in fluid communication with the fluid circuit. The spool valve has a first configuration with zero flow to the fluid circuit, a second configuration providing a first flow to the fluid circuit through the first outlet, and a third configuration providing a second flow to the fluid circuit through the first and second outlets. The valve is adapted to modulate the first flow between zero flow and a first flow threshold. The valve is also adapted to modulate the second flow between the first flow threshold and a second flow threshold, the second flow threshold greater than the first flow threshold.

According to another embodiment, a valve assembly is provided with a valve housing defining an fluid inlet, a first fluid outlet having a first cross sectional area, and a second fluid outlet having a second cross sectional area. The inlet and the first and second outlets are spaced apart along a longitudinal axis of the valve housing with the first cross sectional area being less than the second cross sectional area. A spool is positioned within the valve housing and is adapted to translate along the longitudinal axis of the valve housing. The spool has a first end region and a second end region. A biasing member is positioned adjacent to the second end region and is adapted to bias the spool towards a zero stroke distance. A valve actuator is adapted to apply a force to the first end region such that the spool moves a stroke distance. The valve actuator is adapted to control and modulate fluid flow through the valve assembly as a function of stroke distance. The fluid inlet and the first fluid outlet are in fluid communication when the stroke distance is between a first distance and a second distance such that fluid flow through the first fluid outlet is a first function of the stroke distance bounded by zero flow and a first flow threshold. The fluid inlet and the first fluid outlet and second fluid outlet are in fluid communication when the stroke distance is between a third distance and a fourth distance such that fluid flow through the first and second fluid outlets is a function of the stroke distance bounded by the first flow threshold and a second flow threshold greater than the first flow threshold. The first distance, second distance, third distance, and fourth distance are in increasing order of stroke distance.

Various embodiments of the present disclosure have associated, non-limiting advantages. For example, a valve assembly may be provided to control a flow rate of cooling and/or lubricating fluid to a clutch assembly, such as a clutch assembly forming a portion of a dual clutch in a dual clutch assembly in a transmission. The valve assembly may be a spool valve that controls clutch cooling and/or lubricating flow to an accurate level as well as having modulatability with higher flows. The spool valve may be provided with an inlet and two separate outlets, with both outlets providing cooling and/or lubricating flow to the clutch assembly. Flow past the valve is controlled by the positioning of the spool and a stroke distance of the spool. In one embodiment of the spool valve, one of the outlets is positioned prior to the other outlet or at a smaller stroke distance of the spool. The first outlet is connected in series with an orifice. Flow through the second outlet may be modulated through another orifice larger than that of the first orifice, a metering notch, or a larger valve area. Both outlets of the valve are used to modulate flow to the clutch. In another embodiment, a second spring and moveable collar are provided such that as the spool is displaced to the right, a large diameter portion of the spool engages the collar and acts against the second spring where the increased force required to displace the spool against the second spring reduces the amount of spool displacement required. Various embodiments of the spool valve provides accurate flow control across a wide range of pressures.

DETAILED DESCRIPTION

As required, a detailed description of the embodiments of the present disclosure are provided below; however, it is to be understood that the disclosed embodiments are examples of the invention that may be embodied in various and alternative forms. The figures are not necessarily to scale; some features may be exaggerated or minimized to show details of particular components. Specific structural and functional details disclosed herein are not to be interpreted as limiting, but merely as a representative basis for teaching one skilled in the art how to practice the present invention.

Various embodiments of the disclosure relate to a valve assembly with controlled low flow and controlled high flow, where the flow through the valve is controlled to provide accurate flow across a wide range of pressures and conditions. The valve assembly may be used with a clutch pack in a transmission, such as a dual clutch transmission, as well as other applications requiring valve performance as described herein.

Figure 1:
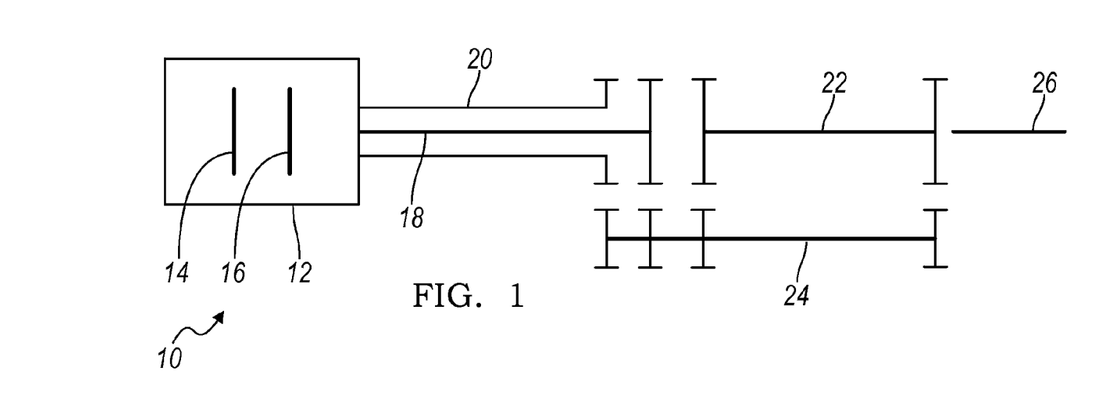
FIG. 1 illustrates a schematic of a dual clutch transmission according to an embodiment.

A dual clutch transmission 10 according to an embodiment for use with a valve assembly as described herein is shown in FIG. 1. The transmission 10 is illustrated as a schematic and may include any number of gearsets on the various shafts. Additionally, the transmission 10 is illustrated without shifting clutches, and the various gearsets may be fixed with their respective shaft, journaled to the shaft, on a sleeve shaft, etc. Of course, the valve assembly may also be used with other dual clutch transmissions, other transmissions, and other suitable applications as is known in the art. The transmission 10 has a twin clutch pack or dual clutch 12 that receives a torque input. The dual clutch 12 contains a first clutch 14 and a second clutch 16. The clutches 14, 16 may be wet clutches.

The clutch 14 is connected to a first input shaft 18 having at least one headset. The second clutch 16 is connected to a second input shaft 20 having at least one headset. The second input shaft 20 is coaxial with the first input shaft 18. The second input shaft 20 is also concentric with the first input shaft 18. When clutch 14 is engaged, torque is transferred to the first input shaft 18. When clutch 16 is engaged, torque is transferred to the second input shaft 20. The clutches 14, 16 may be selectively engaged during operation of the transmission 10.

The transmission 10 has at least one countershaft 24 or layshaft with gears in meshed engagement with the corresponding headsets of the first and second input shafts 18, 20. The transmission 10 also has at least one mainshaft 22 with gears in meshed engagement with corresponding gears on the countershaft 24. The mainshaft 22 may be coaxial with the input shafts 18, 20. Additionally, the input shaft 18 may also be selectively engaged with the mainshaft 22. The transmission 10 has an output shaft 26. The transmission 10 may also have a power take off unit, a range gearing or auxiliary gearing system connected to the output shaft 26, and other components for use with the transmission 10 as are known in the art.

Figure 2:
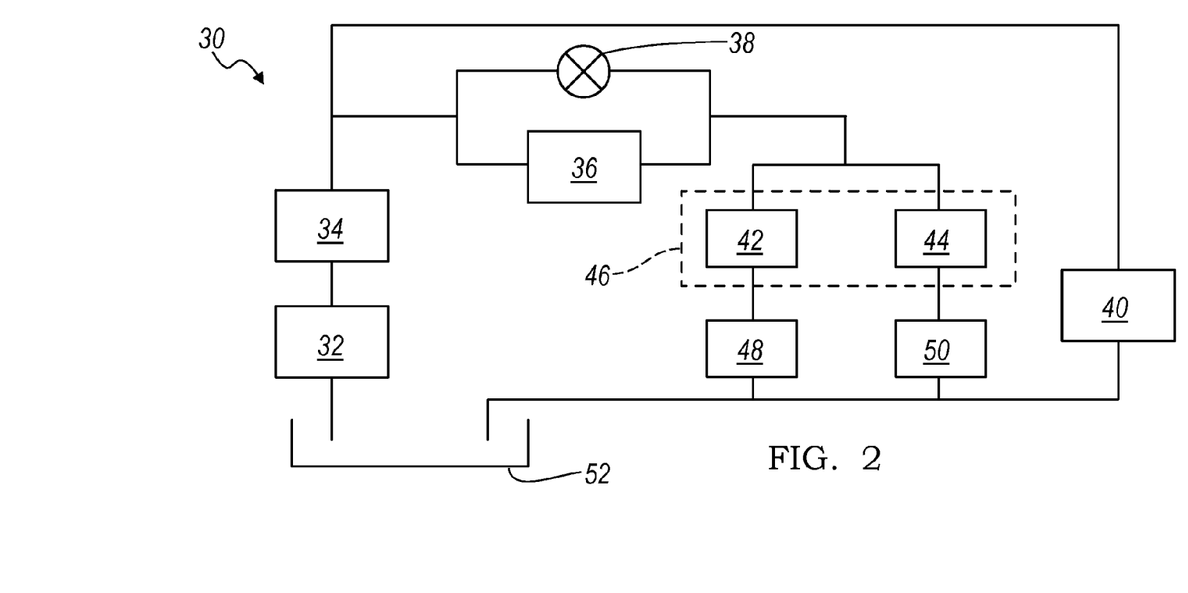
FIG. 2 illustrates a schematic of a hydraulic system for use with the transmission of FIG. 1 according to an embodiment.

A hydraulic system 30 or fluid system 30 is illustrated in FIG. 2 according to an embodiment. The hydraulic system may be used with transmission 10 or another transmission. The various components of the system 30 may be rearranged, and components may be added to or removed from the system 30 while remaining within the spirit and scope of the disclosure. The system 30 contains a fluid, which may be used for at least one of cooling the transmission 10, lubricating components of the transmission 10, and actuating clutches in the transmission 10. The system 30 has a pump system 32 providing fluid to a manifold system 34.

Fluid in the system 30 may be directed from the manifold system 34 to an actuation control manifold 40. In one example, this is a high pressure supply from the manifold system 34. The manifold 40 may include various valves, pilot lines, solenoids, and the like to engage, disengage, or provide pressurized fluid to clutch 14, clutch 16, or other shifting clutches or shifting rails within the transmission 10.

Fluid is may also be directed from the manifold system 34 to either a heat exchanger system 36 or a bypass valve 38 around the heat exchanger system 36. In one example, this is a low pressure supply from the manifold system 34. The heat exchanger system 36 provides for cooling of the fluid in the system 30 and may use air or another working fluid to cool the system 30 fluid.

Fluid in the system may then flow from the heat exchanger 36 and/or bypass valve 38 to valve assembly 42 and valve assembly 44 in a clutch cooling module 46. Valve assembly 42 provides fluid to a fluid circuit having cooling and/or lubricating passages 48 in the clutch 14. Valve assembly 44 provides fluid to a fluid circuit having cooling and/or lubricating passages 50 in the clutch 16. Valves 42 and 44 are described below with reference to FIGS. 3-9. Valve assembly 42 may be identical to or sized differently from valve 44. In other embodiments, only one valve is used to provide cooling and/or lubricating fluid flow to the clutch passages 48, 50. Fluid in the system 30 returns to sump or reservoir 52.

FIGS. 3-6 illustrate an embodiment of a valve assembly 60. Valve 60 may be used as valve 42 or valve 44 in the hydraulic system 30 and transmission 10 as described above. The valve assembly 60 is a spool valve and has a housing 62 containing a spool 64. The spool 64 is adapted to translate longitudinally along a longitudinal axis 66 of the housing 62 to regulate fluid flow across the valve 60.

Figure 3:
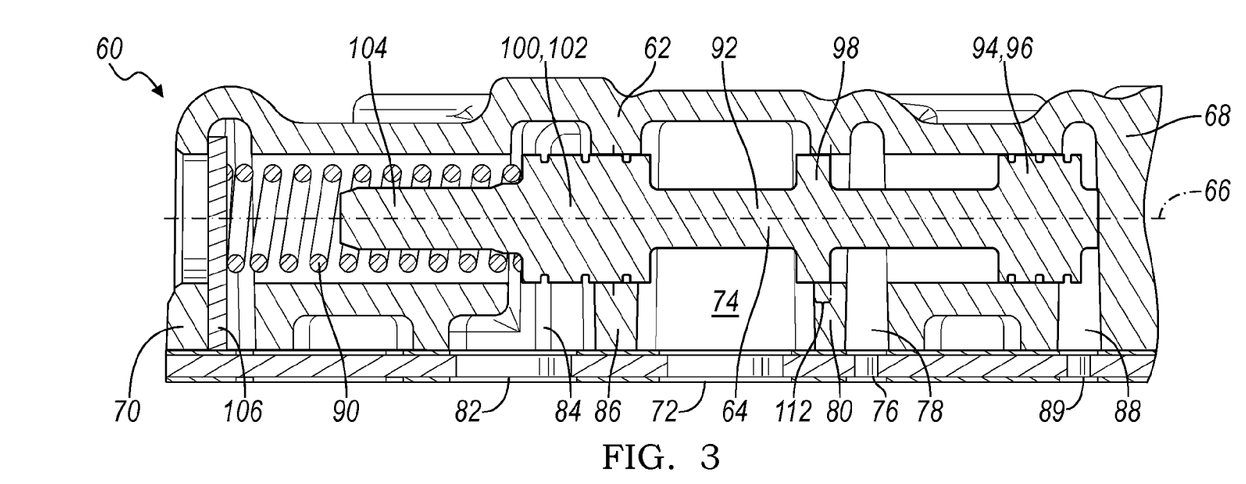
FIG. 3 illustrates a valve assembly according to an embodiment in a first, closed position.

The housing 62 has a first end 68 and a second end 70. The housing 62 defines a fluid inlet 72 to an inlet chamber 74. The housing 62 defines a first fluid outlet 76 and a first outlet chamber 78. The inlet chamber 74 and outlet chamber 78 are spaced apart and include a separating wall 80 having a bore or passage sized to receive the spool 64.

The housing 62 also defines a second fluid outlet 82 and a second outlet chamber 84. The inlet chamber 74 and outlet chamber 84 are spaced apart and include a partial separating wall 86 having a bore or passage sized to receive the spool 64.

The inlet 72, first outlet 76, second outlet 82, and a pilot opening 89 may be provided in a separator plate adjacent to the housing 62. The housing 62 may be cast or otherwise formed.

The inlet 72 is positioned between and spaced apart from the two fluid outlets 76, 82. In one embodiment, the inlet 72 is in fluid communication with the heat exchanger 36 and bypass valve 38 of FIG. 2, and the fluid outlets 76, 82 are in fluid communication with the one of the passages 48, 50 for a clutch.

The housing 62 also defines a valve actuator 88 at a first end of the housing 62. The actuator 88 may be a fluid passage connected to an inlet 89 for a pilot pressure line for valve actuation, or alternatively, may be a mechanical or electromechanical system such as a cam system, a solenoid, or the like. Additionally, the actuator 88 may be manually operated and/or automatically operated.

A biasing member 90 is positioned between the spool 64 and the second end 70 of the housing 62. The biasing member 90 may be a spring that is adapted to provide a biasing force on the spool 64 to bias the spool 64 towards a closed valve position, or the first configuration with zero flow across the valve 60, as is shown in FIG. 3. In the embodiment shown in FIG. 3, the biasing member 90 biases the spool 64 to the right and towards the first end 68 of the housing.

The spool 64 has a central member 92 and lands that are radially spaced from the central member 92 and are generally flush with the passages through the partition walls 80, 86 to selectively connect and disconnect the fluid inlet and outlets of the housing as the spool 64 is moved relative to the housing 62.

A first land 94 is generally cylindrical and is received within a bore formed in the housing 62 between the actuator chamber 88 and the first outlet chamber 78. The first land 94 is adjacent with or forms an end region 96 for the spool 64. For a valve 60 using pilot pressure to control the position of the spool 64, as the pilot pressure increases, the force on the end 96 of the spool 64 increases, and the spool 64 moves or translates towards the other end 70 of the housing, or to the left as shown in FIG. 3. The land 94 prevents pilot fluid from flowing to the outlet chamber 78.

A second land 98 is positioned to cooperate with the partition wall 80 to control fluid flow from the inlet chamber 74 to the first outlet chamber 78.

A third land 100 is positioned to cooperate with the partition wall 86 to control fluid flow from the inlet chamber 74 to the second outlet chamber 84. The third land 100 forms an end region 102 of the spool 64. The end region 102 may include a post 104 that is received within the biasing member 90 and is used to limit the travel, or the stroke distance, of the spool 64 within the housing 62 by cooperating with an end plate 106 positioned at an end 70 of the housing. The stroke distance of the spool is the distance of the spool 64 from the end wall 68 of the housing 62, with a stroke distance of zero shown in FIG. 3.

Figure 7:
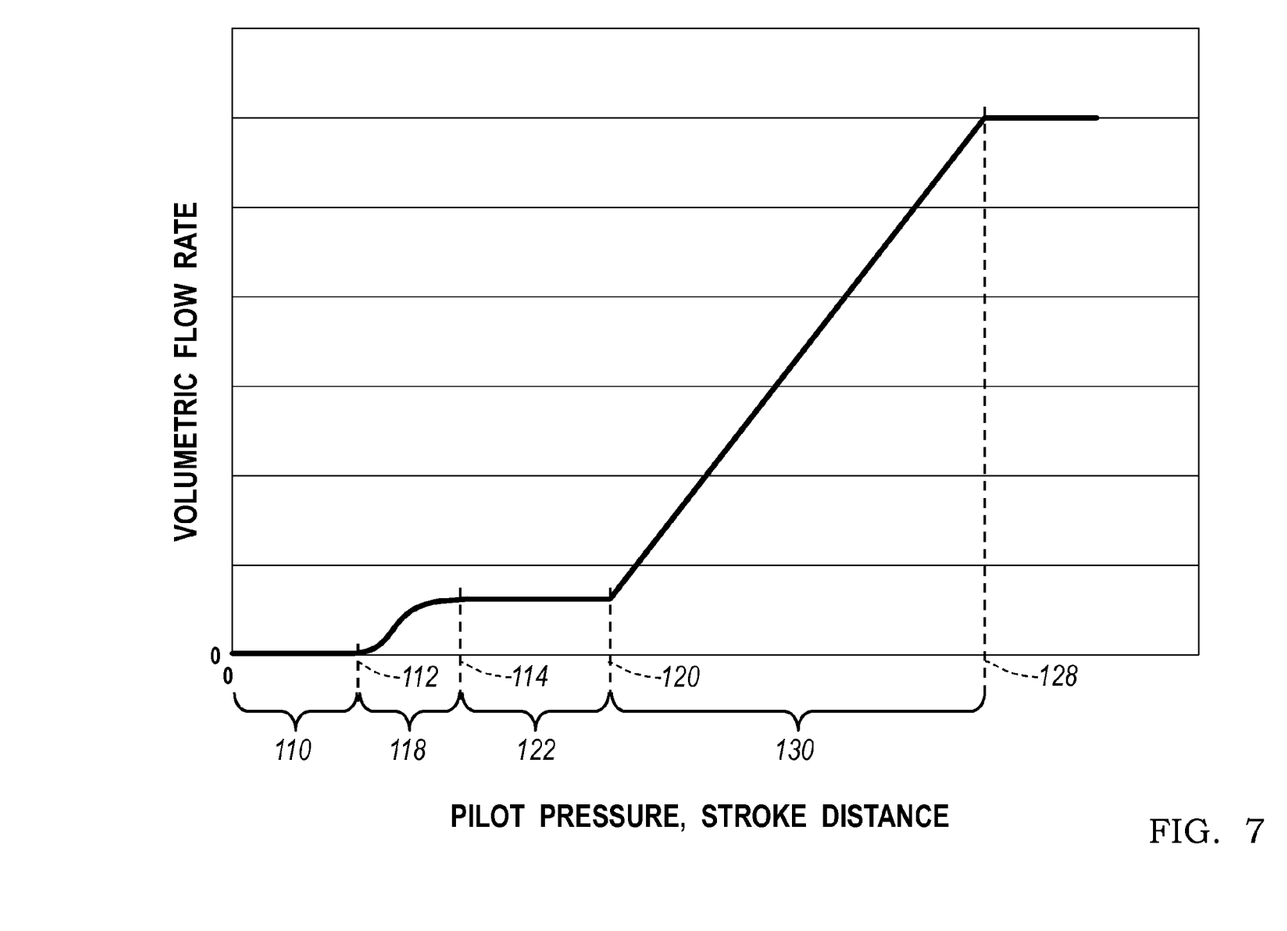
FIG. 7 illustrates a graph showing volumetric flow rate versus pilot pressure or stroke distance for the valve of FIG. 3.

The valve 60 is illustrated in a first, closed position or first configuration in FIG. 3 where the fluid at the fluid inlet 72 is prevented from exiting the valve 60 through either fluid outlet 76, 82, thereby providing for zero flow across the valve 60. In the first configuration, the pilot pressure providing a force on the end 96 of the spool 64 is less than the opposing force provided by the biasing member 90 on the other end 102 of the spool 64. The land 98 cooperates with wall 80 to prevent flow from the inlet 72 to the first outlet 76. The land 100 cooperates with wall 86 to prevent flow from the inlet 72 to the second outlet 82. The closed valve position or first configuration is shown in FIG. 7 as region 110.

Figure 4:
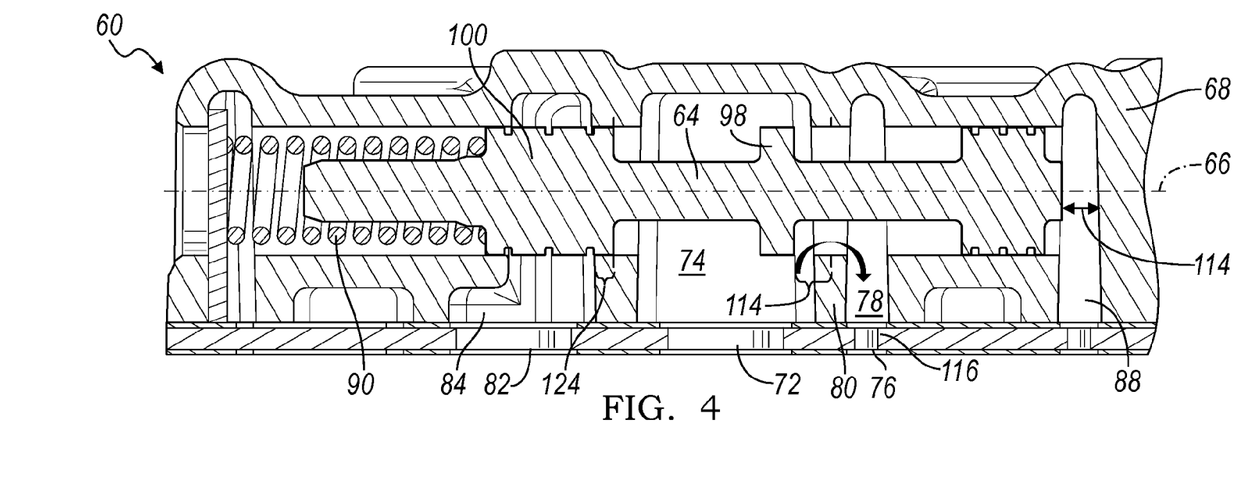
FIG. 4 illustrates the valve assembly of FIG. 3 in a first position providing flow through one outlet.

The valve 60 is illustrated in a second position or second configuration in FIG. 4 with fluid flow from the inlet 72 to only the first fluid outlet 76. The pilot pressure in chamber 88 is sufficient to overcome the initial biasing force of the biasing member 90 to move the spool 64 along the longitudinal axis 66 of the valve 60 and away from the end 68 of the housing 62. The spool 64 is moved a longitudinal distance bounded by a first stroke distance and a second stroke distance. At the first stroke distance, shown as distance 112 in FIG. 3, the inlet 72 and the first fluid outlet 76 are in fluid communication such that the valve 60 provides flow to the clutch assembly from the first fluid outlet 76 alone.

In FIG. 4, the spool 64 is shown as being at the second stroke distance 114, where flow through the first fluid outlet 76 is at a first threshold value, or at a maximum flow rate. The first fluid outlet 76 contains a metering orifice 116 or other flow restriction in series with the first fluid outlet 76, which provides a shelf or constant flow at the first threshold through the first fluid outlet 76 even as the stroke distance increases and the spool 64 is opened further. The flow through the valve 60 in the first configuration is illustrated as region 118 in FIG. 7, with flow across the valve beginning with the spool 64 at the first stroke distance 112 with zero flow, and reaching a constant value at a first threshold through the orifice 116 with the spool 64 at the second stroke distance 114.

For a clutch application of the valve assembly 60, the orifice 116 may be sized to provide an accurate and metered amount of fluid flow to keep the clutch plates wetted at a predetermined amount. The precise flow provided by the orifice 116 allows for accurate control of the flow getting to the clutch, which increases the accuracy of clutch thermal predictions and minimizes clutch drag. The flow rate is a function of the orifice 116 size, and the flow rate may be targeted to various levels depending on the needs of the clutch system, ranging from a minimum flow for maintaining clutch wetness to sufficient flow to satisfy lubrication requirements for higher thermal events from the clutch.

As can be seen in FIG. 7, as the stroke distance increases, or similarly, as the pilot pressure increases, from the first stroke distance 112 to the second stroke distance 114, the flow rate provided by the first fluid outlet 76 of the valve 60 increases. By controlling the pilot pressure or the actuator 88 to provide a desired stroke distance within the range 118, control of the flow rate from the valve 60 in a low flow condition through the first outlet 76 is provided. The valve 60 in the first configuration has a low flow rate that is controllable to an accurate flow rate.

As the stroke distance of the spool 64 increases from the second stroke distance 114 to the third stroke distance 120, the flow through the valve 60 is provided by the first fluid outlet 76 only, as the land 100 continues to isolate the second fluid outlet 82 from the fluid inlet 72. The spool 64 has an overlap 124 at the second stroke distance shown in FIG. 4. When the spool 64 passes the third stroke distance 120, the overlap 124 between the land 100 and the housing 62 is removed, and the inlet 72 and second outlet 82 are fluidly connected. As can be seen in FIG. 7, the flow rate between the second and third stroke distances 114, 120 is a generally constant value at the first threshold in region 122, as the flow is limited or metered by orifice 116. The constant flow in region 122 allows for a very high confidence in achieving a targeted shelf flow rate while accounting for various production tolerances. The shelf width, corresponding to the stroke distance in region 124, may be adjusted to be wider or narrower depending on the tolerances involved and certainty desired in hitting the shelf. Having a shelf flow rate allows tolerances on various valve or clutch components to be relaxed, reducing complexity and costs in the system and manufacturing thereof. By controlling the pilot pressure or the actuator 88 to provide a desired stroke distance within the range 122, the flow rate from the valve 60 is held to a generally constant value during a transition from the low flow, second configuration to a high flow, third configuration.

Figure 5:
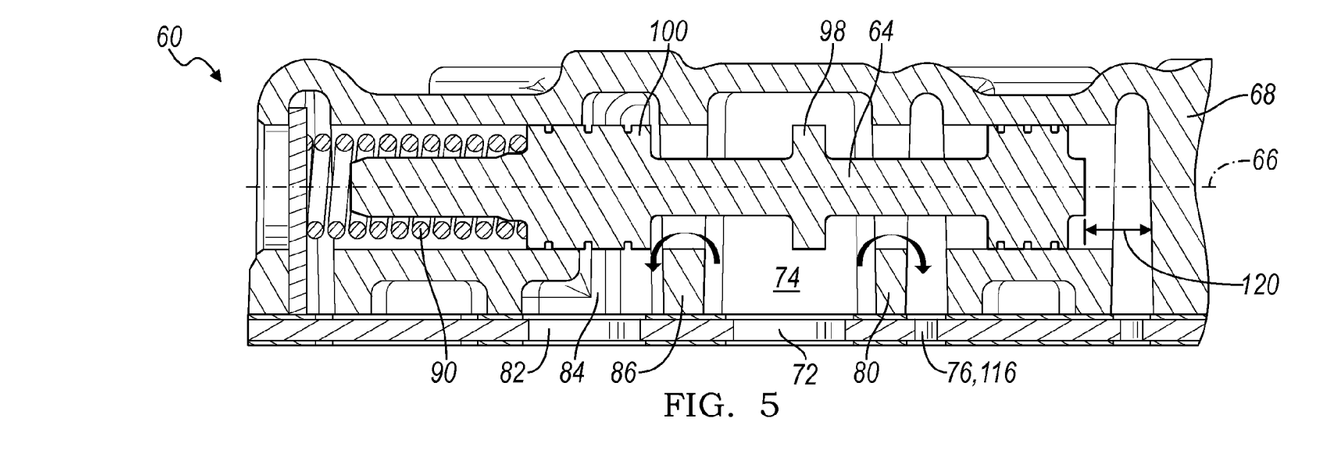
FIG. 5 illustrates the valve assembly of FIG. 3 in a second position providing modulated flow through two outlets.

The valve 60 is illustrated in a third position or third configuration in FIG. 5 with fluid flow from the inlet 72 to both of the fluid outlets 76, 82. The spool 64 has been moved to a position or stroke distance just greater than the third stroke distance 120 such that the valve 60 provides flow from both the first and second fluid outlets 76, 82. Flow through the first outlet 76 may be at the maximum metered flow rate or first threshold as described for region 122 depending on the fluid pressure at the inlet 72. The land 98 continues to be longitudinally spaced apart from the wall 80 such that the fluid inlet 72 and first fluid outlet 76 are in fluid communication. Additional flow across the valve 60 is provided by the second outlet 82, and the spool 64 position may be moved to modulate fluid flow provided by the valve 60. At a distance just greater than the third stroke distance, land 100 becomes longitudinally spaced apart from the partition wall 86 such that the inlet 72 is in fluid communication with the second outlet 82.

As can be seen in FIG. 5, the second fluid outlet 82 may be a generally unrestricted flow passage 82 or valve area with a greater cross sectional area than the cross sectional area of orifice 116. In one embodiment, the passage 82 may be provided with another orifice having a diameter greater than a diameter of orifice 116. In another embodiment, as described with respect to FIG. 8, a metering notch, such as a v-notch 142 may be provided in the chamber 84. In further embodiments, the passage 82 or chamber 84 may be other shapes having a larger area than the orifice 116.

Figure 6:
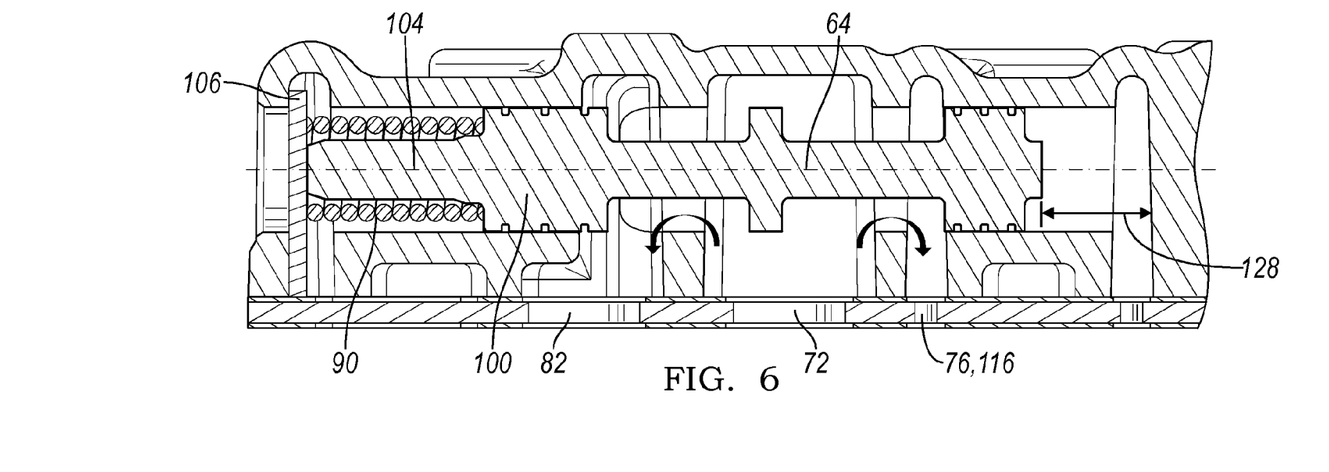
FIG. 6 illustrates the valve assembly of FIG. 3 in a third, fully open position.

The valve 60 is illustrated in a further example of the third configuration in FIG. 6 with fluid flow from the inlet 72 to both of the fluid outlets 76, 82. The valve 60 is in a fully open position with a maximum flow or flow at a second threshold across the valve 60. The spool 64 is moved to a fourth stroke distance 128. The post 104 of the spool 64 may be in contact with plate 106 at the fourth stroke distance, or may be spaced apart from the plate 106 to provide for an additional constant maximum flow at the second threshold as shown by the flow rate to the right of the stroke distance 128 in FIG. 7, i.e. if a fifth stroke distance for the post 104 to contact the plate 106 is available.

The third and fourth stroke distances 120, 128 define another range 130 in FIG. 7, where flow is provided by the first outlet 76 and the second outlet 82. As the stroke distance of the spool 64 increases from the third stroke distance 120 towards the fourth stroke distance 128, the flow rate provided by the valve outlets 76, 82 increase as flow through the second outlet 82 increases. By controlling the pilot pressure or the actuator 88 to provide a desired stroke distance of the spool 64 within range 130, control of the flow rate provided by the valve 60 in a high flow condition is provided. The valve 60 in the third configuration has a flow rate that is controllable to an accurate flow rate between the first and second thresholds.

As shown in FIG. 7, and as described above, the flow rate provided by the valve 60 is a function of the stroke distance of the spool 64 or the pilot pressure of the actuator 88 for the valve 60. The stroke distance of the spool 64 is controlled by the actuator 88, and is a function of the force applied by the actuator 88 on one end 96 of the spool 64 and a biasing force provided by the biasing member 90 on the other end 102 of the spool 64. In one embodiment, a pilot pressure provides the actuating force, and the biasing member 90 may be a spring having a spring constant.

Figure 8:
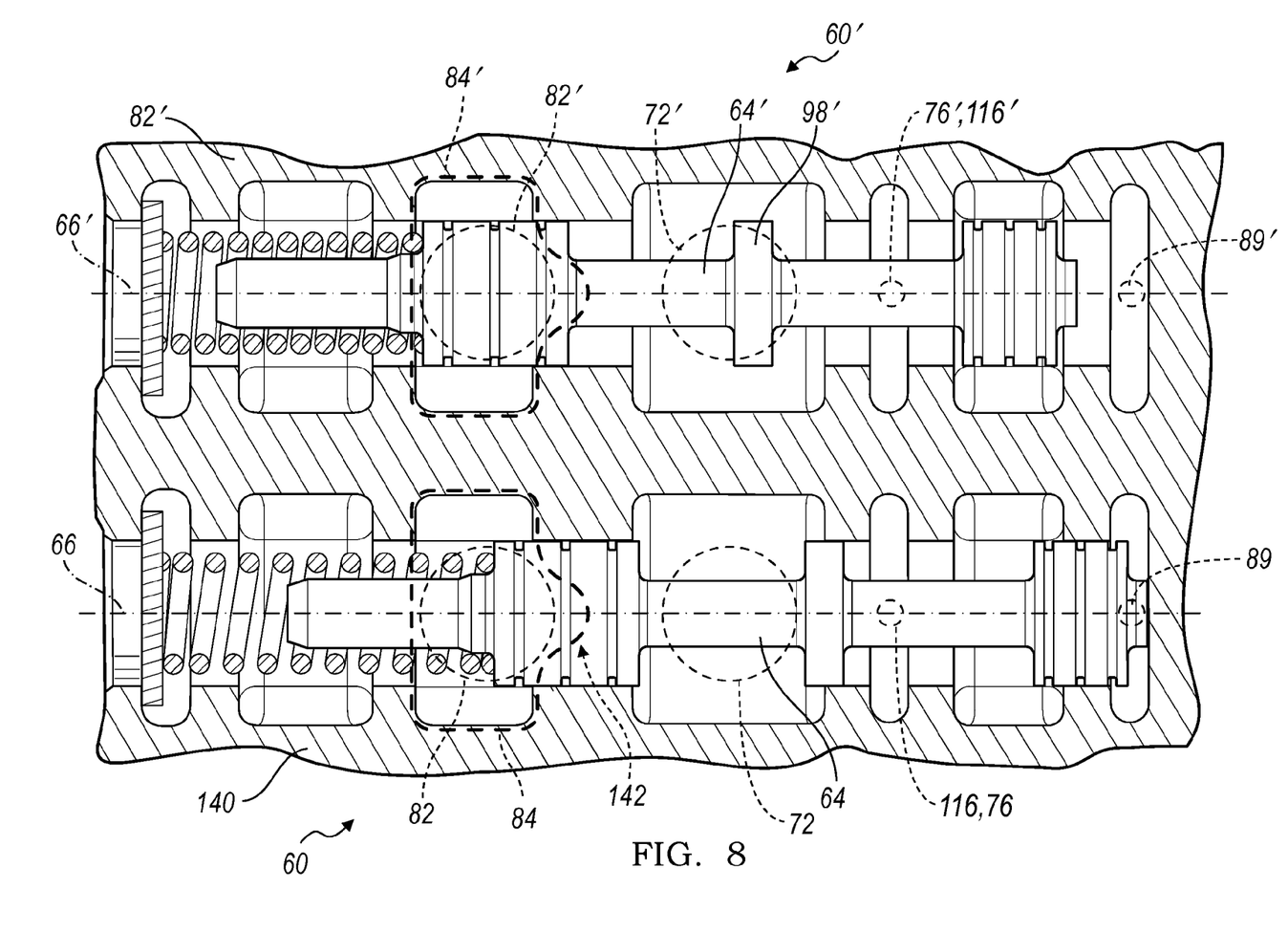
FIG. 8 illustrates a sectional view of the valve of FIG. 3 according to an embodiment.

FIG. 8 illustrates a sectional view of a pair of valves 60, 60', such as valves 42, 44, showing the fluid inlet and outlet channels for each valve 60, 60'. As valve 60' has similar components as valve 60, the corresponding parts are denoted by a prime after the reference number. The valves 60, 60' may share a common housing 140; however, an internal wall may separate the fluid chambers for each valve 60, 60', such that they operate independently of one another.

Although the fluid inlets and fluid outlets of the valves 60, 60' are illustrated as having the same respective areas, in other examples, the inlet and outlets of each valve 60, 60' and/or the chambers of each valve 60, 60' may be sized differently than corresponding components of the other valve 60', 60 based on the cooling and/or lubrication parameters of each clutch.

As can be seen in FIG. 8, the valve inlet 72 is positioned between the first outlet 76 provided by orifice 116 and the second outlet 82. A metering notch 142 may be provided in the chamber 84 for the flow path to the second outlet 82. The port 89 for the pilot pressure line of the actuator is also shown.

The metering notch 142 has a narrow section, or v-section, as shown that widens along an axis transverse to the longitudinal axis 66 as the stroke distance increases. In other embodiments, the notch 142 may have other geometries. The notch 142 provides for variable flow as it provides a variable area increasing with stroke distance for fluid flow through the chamber 84 when the spool 64 is between the third and fourth stroke distances. In one example, as the spool 64 is moved from the fourth stroke distance to the third stroke distance, the fluid flow through the second outlet is gradually decreased to the constant value or first threshold in region 122 based on the reduced flow through the notch 142. This gradual decrease prevents a sudden or abrupt drop in fluid flow to the cooling and lubrication passages in the clutch assembly. The cooling fluid flow in the clutch assembly passages may cooperate with the actuation force for the clutch, such that if the cooling flow is suddenly or abruptly decreased, the actuation forces may suddenly or abruptly increase and result in a torque surge for the clutch. By providing a slow gradual decrease in flow from the valve 60 when the spool 64 is approaching the third stroke distance in region 130, the torque surge may be reduced to a level where it does not cause a driveline disturbance.

Figure 9:
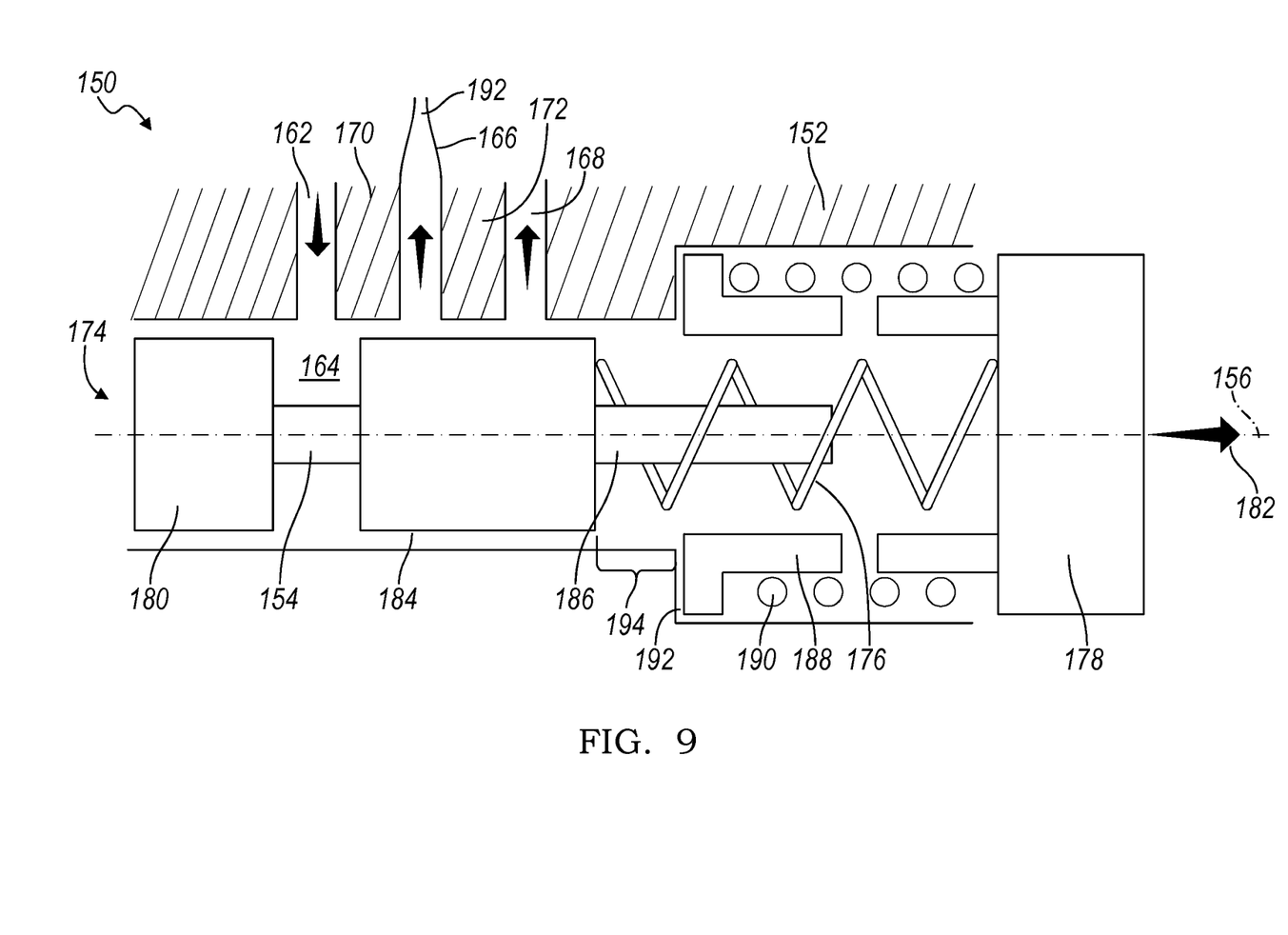
FIG. 9 illustrates a valve assembly according to another embodiment.

FIG. 9 illustrates another embodiment of a valve assembly 150. Valve 150 may be used as valve 42 or valve 44 in the hydraulic system 30 and transmission 10 as described above, and operates to provide fluid flow in a similar manner as valve 60. The valve assembly 150 has a housing 152 containing a spool 154. The spool 154 is adapted to translate longitudinally along a longitudinal axis 156 of the housing 152.

The housing 152 defines a fluid inlet 162 to an inlet chamber 164. The housing 152 defines a first fluid outlet 166 and second fluid outlet 168. The first outlet 166 is positioned between the inlet 162 and the second outlet 168. The first outlet 166 is spaced apart from the inlet 162 by a partition wall 170. The first outlet 166 is spaced apart from the second outlet 168 by another partition wall 172. The inlet 162, first outlet 166, and second outlet 168 are spaced apart along a longitudinal axis 156. In one embodiment, the inlet 162 is in fluid communication with the heat exchanger 36 and bypass valve 38 of FIG. 2, and the fluid outlets 166, 168 are in fluid communication with the one of the passages 48, 50 for a clutch.

The housing 152 also defines a valve actuator 174 at a first end of the housing 152. The actuator 174 may be a fluid passage connected to a pilot pressure line for valve actuation, or alternatively, may be a mechanical or electromechanical system such as a cam system, a solenoid, or the like. Additionally, the actuator 174 may be manually and/or automatically controlled.

A first biasing member 176 is positioned between the spool 154 and a cap 178 at the end of the housing 152. The biasing member 176 may be a spring that is adapted to provide a biasing force on the spool 154 to bias the spool 154 towards a closed valve position with zero flow as is shown in FIG. 9. In the embodiment shown in FIG. 9 the biasing member 176 biases the spool 154 to the left.

The spool 154 has lands that are generally flush with the faces of the housing 152 to selectively connect and disconnect the fluid inlet 162 and outlets 166, 168 of the housing 152.

A first land 180 is generally cylindrical and is received within a bore formed by the housing 152. The first land 180 is adjacent with or forms an end region for the spool 154. For a valve 150 using pilot pressure to control the position of the spool 154, as the pilot pressure increases, the force on the land 180 increases, and the spool 154 moves or translates towards the cap 178. As the actuating force increases, the spool 154 moves a stroke distance in direction 182. The stroke distance is a function of the actuating force and the opposed biasing force, and the fluid flow is a function of the stroke distance of the spool 154. Similarly to valve 60, the valve 150 operates in a first, second or third configuration based on stroke distances and regions of operation. The valve 150 may provide fluid flow according to the chart illustrated in FIG. 7.

A second land 184 is positioned to cooperate with partition walls 170, 172 to control fluid flow from the inlet chamber 164 to the first outlet 166, or the first and second outlets 166, 168.

The second land 184 forms another end region of the spool 154. The land 184 may also include a post 186 that is received within the biasing member 176 and is used to limit the travel of the spool, or the stroke distance, within the housing 152 by cooperating with the end plate 178.

In some examples of the valve 150, the valve 150 also includes a moveable collar 188 and a second biasing member 190. The collar 188 is positioned between the housing 152 and the second biasing member 190. The collar 188 and the second biasing member 190 generally surround and are radially spaced apart from the first biasing member 176. The second biasing member 190 and collar 188 may have an end region 192 that is offset from the end of the first biasing member 176 by a distance 194. Therefore, as the spool 154 initially travels towards the end cap 178, only the first biasing member 176 exerts a basing force on the land 184. When the spool 154 reaches a specified stroke distance, such as forty percent of the full stroke distance, the second stroke distance 114 or a distance within region 122, the land 184 contacts the collar 188, and the second biasing member 190 begins to also provide a force opposed to the actuating force on the land 184. Of course, the specified stroke distance for the spool 154 to contact the collar 188 may be adjusted based on the desired flow rates and response of the valve 150. In one example, the collar 188 and the second biasing member 190 are provided such that as the spool 154 is displaced to the right, a large diameter portion of the spool 154, such as land 184, engages the collar 188 and acts against the second biasing member 190. The increased force required to displace the spool 154 against both the first and second biasing members 176, 190 reduces the amount of spool 154 displacement required to transition from the second to the third configuration while retaining the equivalent increase in actuating force or pilot pressure increase across region 122.

As the stroke distance continues to increase, the collar 188 translates along the longitudinal axis 156, and the biasing members 176, 190 are compressed until the post 186 reaches the end cap 178.

The valve 150 has an orifice 192 in series with the first outlet 166. The second outlet 168 has a larger cross sectional area outlet than the orifice 192 as described above with respect to FIG. 3. The second outlet 168 may include another larger orifice, or a valve passage or area as described above with respect to the embodiment in FIG. 3. The second outlet chamber may include a metering notch, such as a v-notch, as described above with respect to FIG. 8.

Various embodiments of the present disclosure have associated, non-limiting advantages. For example, a valve assembly may be provided to control a flow rate of cooling and/or lubricating fluid to a clutch assembly, such as a clutch assembly forming a portion of a dual clutch in a dual clutch assembly in a transmission. The valve assembly may be a spool valve that controls clutch cooling and/or lubricating flow to an accurate level as well as having modulatability with higher flows. The spool valve may be provided with an inlet and two separate outlets, with both outlets providing cooling and/or lubricating flow to the clutch assembly. Flow past the valve is controlled by the positioning of the spool and a stroke distance of the spool. In one embodiment of the spool valve, one of the outlets is positioned prior to the other outlet or at a smaller stroke distance of the spool. The first outlet is connected in series with an orifice. Flow through the second outlet may be modulated through another orifice larger than that of the first orifice, a metering notch, or a larger valve area. Both outlets of the valve are used to modulate flow to the clutch. In another embodiment, a second spring and moveable collar are provided such that as the spool is displaced to the right, a large diameter portion of the spool engages the collar and acts against the second spring where the increased force required to displace the spool against the second spring reduces the amount of spool displacement required. Various embodiments of the spool valve provides accurate flow control across a wide range of pressures.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fluid system for controlling flow rate to a clutch assembly in a transmission, the system comprising:
   a fluid source;
   a fluid circuit for a clutch assembly in the transmission, the fluid circuit adapted for at least one of cooling and lubricating the clutch assembly; and
   a spool valve for regulating a rate of fluid flow from the fluid source to the fluid circuit of the clutch assembly, the spool valve having a first fluid outlet and a second fluid outlet in fluid communication with the fluid circuit, the spool valve having a first configuration with zero flow to the fluid circuit, a second configuration providing a first flow to the fluid circuit through the first fluid outlet, and a third configuration providing a second flow to the fluid circuit through the first and second outlets, wherein the spool valve is adapted to modulate the first flow between zero flow and a first flow threshold, wherein the spool valve is adapted to modulate the second flow between the first flow threshold and a second flow threshold, the second fluid outlet having a greater cross sectional area than the first fluid outlet, wherein the second flow threshold is greater than the first flow threshold.

2. The fluid system of claim 1 further comprising a spool valve actuator adapted to control a stroke distance of the spool valve, thereby causing the spool valve to operate in one of the first, second, and third configurations.

3. The fluid system of claim 2 wherein the spool valve actuator is a pilot pressure line.

4. The fluid system of claim 2 wherein the rate of fluid flow through the spool valve is a function of the stroke distance.

5. The fluid system of claim 2 wherein the spool valve in the second configuration is adapted to modulate and control the first flow as a first function of the stroke distance of the spool valve, wherein the first function includes a linear relationship between the rate of fluid flow and the stroke distance.

6. The fluid system of claim 5 wherein the spool valve in the third configuration is adapted to modulate and control the second flow as a second function of the stroke distance, wherein the second function includes another linear relationship between the rate of fluid flow and the stroke distance.

7. A fluid system for controlling flow rate to a clutch assembly in a transmission, the system comprising:
a fluid source;
a fluid circuit for a clutch assembly in the transmission, the fluid circuit adapted for at least one of cooling and lubricating the clutch assembly; and
a spool valve for regulating a rate of fluid flow from the fluid source to the fluid circuit of the clutch assembly, the spool valve having a first fluid outlet and a second fluid outlet in fluid communication with the fluid circuit, the spool valve having a first configuration with zero flow to the fluid circuit, a second configuration providing a first flow to the fluid circuit through the first fluid outlet, and a third configuration providing a second flow to the fluid circuit through the first and second outlets, wherein the spool valve is adapted to modulate the first flow between zero flow and a first flow threshold, wherein the spool valve is adapted to modulate the second flow between the first flow threshold and a second flow threshold, the second flow threshold greater than the first flow threshold, wherein the spool valve further comprises a valve housing defining a fluid inlet, wherein the first fluid outlet has a first cross sectional area, and the second fluid outlet has a second cross sectional area, the inlet and the first and second outlets spaced apart along a longitudinal axis of the valve housing, the first cross sectional area being less than the second cross sectional area; and
a spool valve actuator adapted to control a stroke distance of the spool valve, thereby causing the spool valve to operate in one of the first, second, and third configurations.

8. The fluid system of claim 7, further comprising:
a spool of the spool valve positioned within the valve housing and adapted to translate along the longitudinal axis of the valve housing, the spool having a first end region and a second end region; a biasing member positioned adjacent to the second end region and adapted to bias the spool towards a zero stroke distance, wherein the valve actuator is adapted to apply a force to the first end region such that the spool moves a stroke distance, wherein the fluid system is adapted to control and modulate fluid flow through the valve housing as a function of stroke distance; wherein the fluid inlet and the first fluid outlet are in fluid communication when the stroke distance is between a first distance and a second distance such that fluid flow through the first fluid outlet is a first function of the stroke distance bounded by zero flow and a first flow threshold; wherein the fluid inlet and the first fluid outlet and second fluid outlet are in fluid communication when the stroke distance is between a third distance and a fourth distance such that fluid flow through the first and second fluid outlets is a function of the stroke distance bounded by the first flow threshold and a second flow threshold greater than the first flow threshold; and wherein the first distance, second distance, third distance, and fourth distance are in increasing order of stroke distance.

9. The fluid system of claim 8 wherein the fluid inlet and the first fluid outlet are in fluid communication when the stroke distance is between the second distance and the third distance such that fluid flow through the first fluid outlet is generally constant at the first flow threshold.

10. The fluid system of claim 9 wherein the housing defines a first orifice in the first fluid outlet, the first orifice providing the first cross sectional area.

11. The fluid system of claim 10 wherein the fluid inlet is positioned between the first fluid outlet and the second fluid outlet; and wherein the spool further comprises a first land, a second land, and a third land, the first land forming the first end region, the third land forming the second end region, and the second land positioned between the first and second lands.

12. The fluid system of claim 11 wherein the second land is adapted to provide a fluid barrier between the fluid inlet and one of the first and second fluid outlets; and wherein one of the first and third lands is adapted to provide a fluid barrier between the fluid inlet and the other of the first and second fluid outlets.

13. The fluid system of claim 10 wherein the first fluid outlet is positioned between the fluid inlet and the second fluid outlet; and wherein the spool further comprises a first land forming the first end region and a second land forming the second end region.

14. The fluid system of claim 13 wherein the second land is adapted to provide a fluid barrier between the fluid inlet and the first and second fluid outlets; and wherein the first fluid outlet and the second fluid outlet are spaced apart by a distance equal to a difference between the third distance and the second distance.

15. The fluid system of claim 13 wherein the biasing member is a first biasing member; the valve assembly further comprising a collar and a second biasing member positioned between the collar and the valve housing, the collar and the second biasing member radially spaced apart from the first biasing member; wherein the second end region of the spool is adapted to interact with the collar such that the second biasing member biases the spool towards zero stroke distance; and wherein an end of the biasing member adapted to contact the spool is longitudinally spaced apart from an end of the first biasing member adapted to contact the spool.

16. The fluid system of claim 15 wherein the second biasing member is adapted to contact the spool when the stroke distance is between the third distance and the fourth distance.

17. The fluid system of claim 10 wherein the housing defines a metering notch in the second fluid outlet, the metering notch providing the second cross sectional area and wherein the metering notch is a v-notch with a narrow portion of the v-notch in fluid communication with the fluid inlet.

18. A fluid system for controlling flow rate to a clutch assembly in a transmission, the system comprising:
a fluid source;
a fluid circuit for a clutch assembly in the transmission, the fluid circuit adapted for at least one of cooling and lubricating the clutch assembly; and
a spool valve for regulating a rate of fluid flow from the fluid source to the fluid circuit of the clutch assembly, the spool valve having a first fluid outlet having a first cross sectional area and a second fluid outlet having a second cross sectional area, the first and second cross sectional areas being distinct sizes, the first and second fluid outlets in fluid communication with the fluid circuit, the spool valve having a first configuration with zero flow to the fluid circuit, a second configuration providing a first flow to the fluid circuit through the first fluid outlet, and a third configuration providing a second flow to the fluid circuit through the first and second outlets, wherein the spool valve is adapted to modulate the first flow between zero flow and a first flow threshold, wherein the spool valve is adapted to modulate the second flow between the first flow threshold and a second flow threshold, the second flow threshold greater than the first flow threshold.

19. The fluid system of claim 18 wherein the spool valve in the second configuration is adapted to modulate and control the first flow as a first function of the stroke distance of the spool valve, wherein the first function includes a linear relationship between the rate of fluid flow and the stroke distance.

20. The fluid system of claim 18 wherein the spool valve in the third configuration is adapted to modulate and control the second flow as a second function of the stroke distance, wherein the second function includes another linear relationship between the rate of fluid flow and the stroke distance.

* * * * *